United States Patent

Hong et al.

[11] Patent Number: 6,091,404
[45] Date of Patent: Jul. 18, 2000

[54] TRACKBALL FOR A PORTABLE COMPUTER

[76] Inventors: Seung Seog Hong, 67-12 Shinwol 5-Dong, Yangcheon-Ku, Seoul; Jae Myon Kim, Goldstar Co., Ltd. PC Lab, Cheongho-Ri, Jinwi-Myon, Pyungtaek-Kun, Kyunggi-Do; Sang Cheon Hyun, #122-206 Cheoncheon Jugong Apartment, 333 Cheoncheon-Dong, Jangan-Ku, Suwon, Kyunggi-Do, all of Rep. of Korea

[21] Appl. No.: 08/350,671

[22] Filed: Dec. 7, 1994

[30] Foreign Application Priority Data

Dec. 7, 1993 [KR] Rep. of Korea .................... P93-26729

[51] Int. Cl.⁷ ...................................................... G06F 15/00
[52] U.S. Cl. .......................... 345/167; 345/156; 345/164; 345/168
[58] Field of Search ................................. 345/156, 163, 345/164, 166, 167, 168, 169

[56] References Cited

U.S. PATENT DOCUMENTS 4,754,268  6/1988  Mori ......................................... 345/163
5,049,863  9/1991  Oka .......................................... 345/163
5,166,668  11/1992  Aoyagi ..................................... 345/180
5,546,334  8/1996  Hsieh et al. ............................. 708/141

*Primary Examiner*—Bipin Shalwala
*Assistant Examiner*—Vincent E. Kovalick

[57] ABSTRACT

The present invention relates to a trackball for a portable computer, which can be operated when not only is a trackball mounted on the main body of the portable computer, but is also detached from the main body of the computer. To achieve the aforementioned object, there is provided a trackball, which is capable of detecting whether it is mounted on or detached from the body of a portable computer, for transmitting a cursor movement signal through a wire when the trackball is mounted on the body of the portable computer, or a wireless cursor movement signal into the air when the trackball is detached from the body of the portable computer, and an interface employed inside the portable computer having an system controller, which is capable of detecting whether the trackball is mounted on or detached from the body of the computer, for processing the cursor movement signal through the wire when the trackball is mounted on the body of the portable computer, or for processing the wireless cursor movement signal through the air when the trackball is detached from the body of the portable computer.

5 Claims, 6 Drawing Sheets

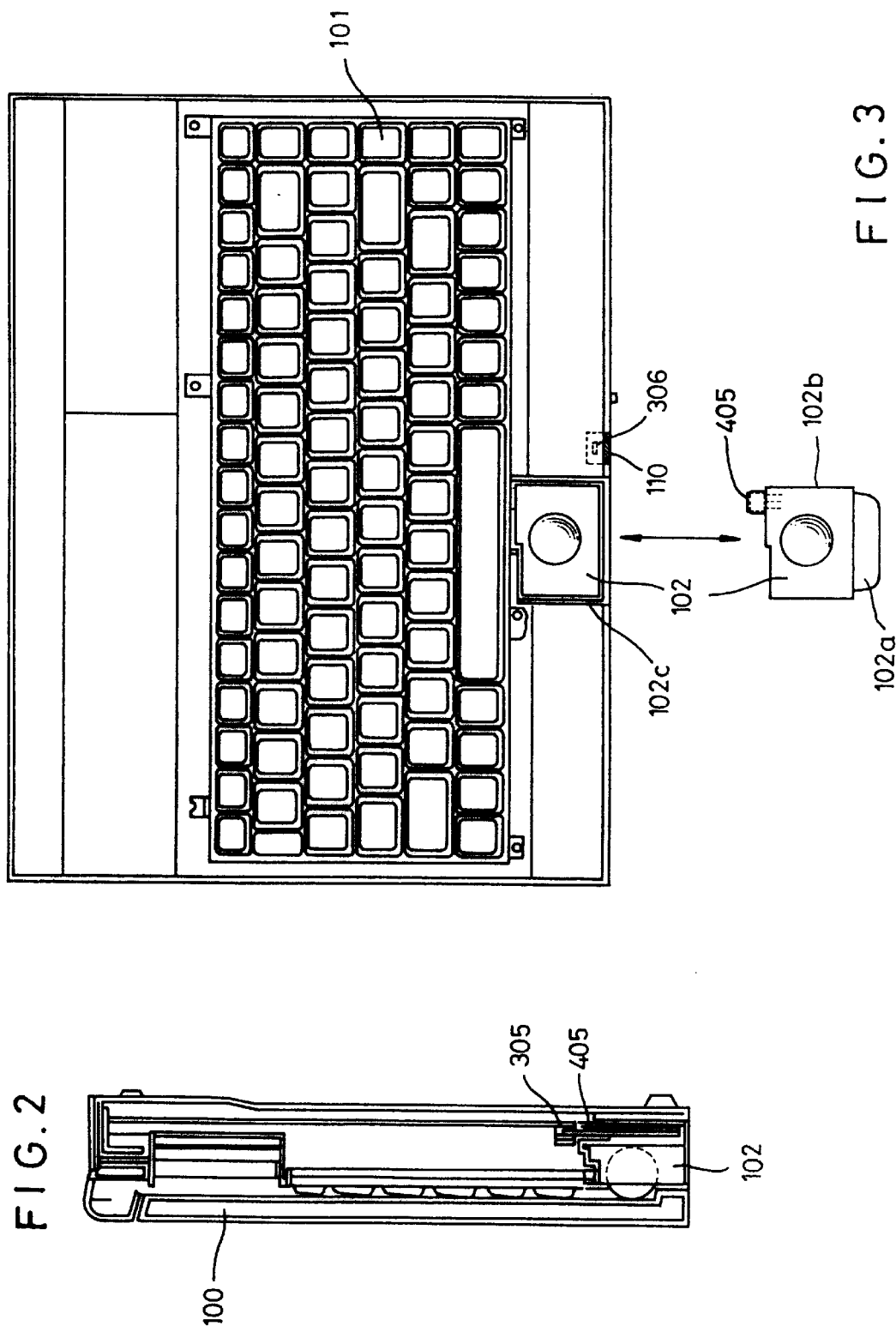

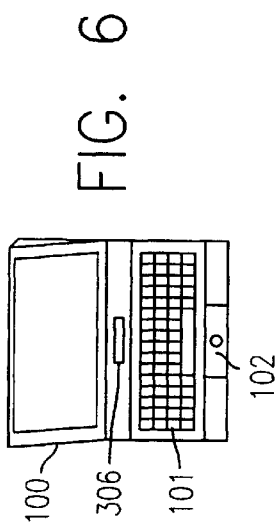
FIG. 6
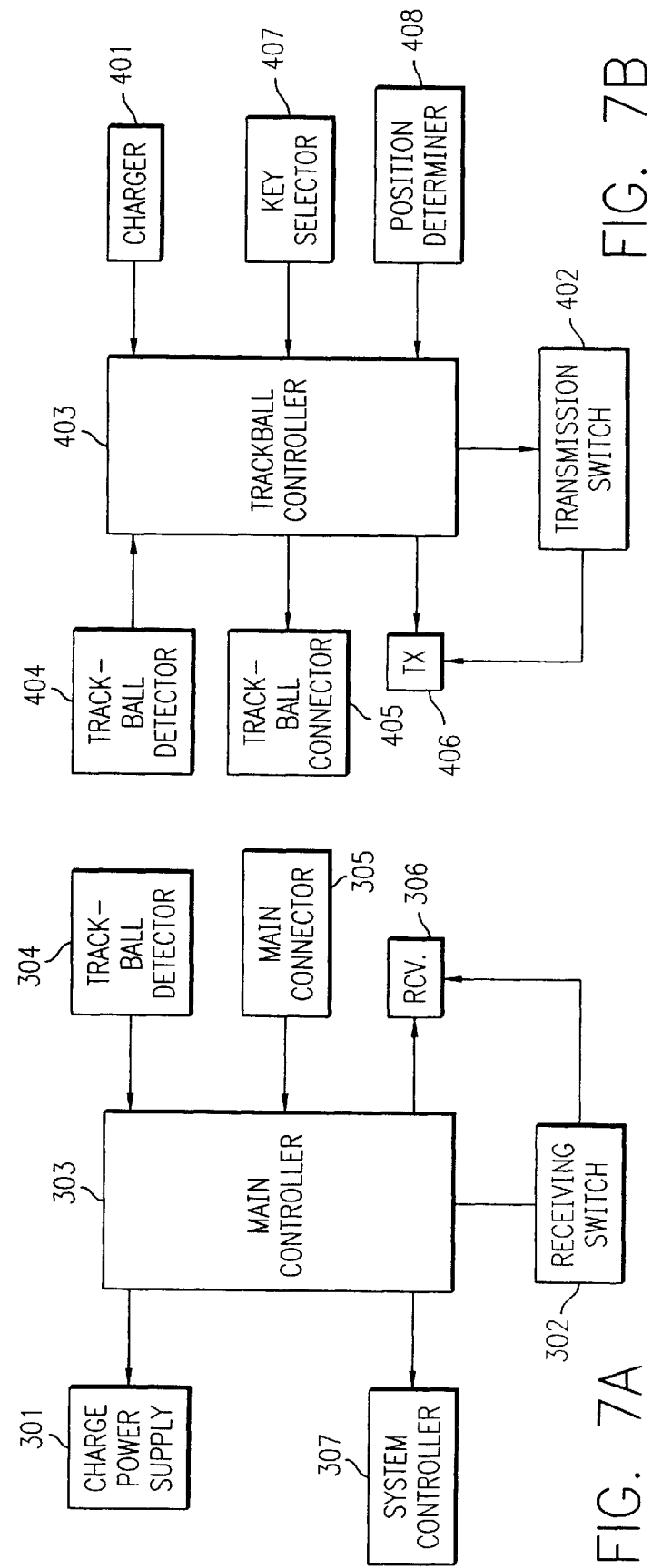
FIG. 7A
FIG. 7B

TRACKBALL FOR A PORTABLE COMPUTER

BACKGROUND OF THE INVENTION

1. Field of the Invention

The present invention relates to a trackball, as an input device, for a portable computer such as a notebook computer, a laptop computer, etc. More particularly the present invention relates to a trackball for a portable computer which can be operated not only when the trackball is mounted on a main body of the portable computer but also when it is detached from the main body of the portable computer.

2. Description of the Prior Art

In a computer, an input device thereof for entering data by moving a cursor on a display is generally either a mouse being operated in an area separate from the main body of the computer, or a trackball being manipulated while it mounted on the main body of the computer. A cursor on the display of the computer is moved by operation of a mouse which works in an area separate from the main body of the computer. The cursor is also moved by manipulation of a trackball which works while mounted on the main body of the computer.

In such a conventional trackball-mounted portable computer, as shown in FIG. 1, a display assembly 200 for displaying alphanumeric information and data, a keyboard assembly 201 for entering data, a top cover 202 for supporting the keyboard assembly 201 as a top-side enclosure of the computer, a bottom cover 203 for being assembled with the top cover 202, and a trackball 204 installed on the top cover 202 for making a cursor on the display assembly 200 move are provided.

In operation, if a user rotates a ball on the trackball 204, a cursor on the display moves so that an appropriate menu can be chosen.

However, in such a conventional trackball-mounted portable computer, since the trackball is fixed at the main body of the portable computer, it is inconvenient to use the trackball in a separate place from the portable computer. Even though a wired mouse can be used, since the length of the wire is restricted, the working space is to be limited.

SUMMARY OF THE INVENTION

It is an object of the present invention to provide a trackball for a portable computer, which the trackball can be used while mounted on the main body of the portable computer in narrow space, or when detached from the main body of the portable computer in free space.

In order to achieve the object, a trackball, which is capable of detecting whether it is mounted on or detached from the body of a portable computer, is provided for transmitting a cursor movement signal through a wire when the trackball is mounted on the body of the portable computer, or a wireless cursor movement signal into the air when the trackball is detached from the body of the portable computer. An interface is employed inside the portable computer having an system controller, which is capable of detecting whether the trackball is mounted on or detached from the body of the computer, for processing the cursor movement signal through the wire when the trackball is mounted on the body of the portable computer, or for processing the wireless cursor movement signal through the air when the trackball is detached from the body of the portable computer.

BRIEF DESCRIPTION OF THE DRAWINGS

The above object and other advantages of the present invention will become more clear after a description the preferred embodiments of the present invention with regard to the accompanying drawings, wherein:

FIG. 2 is a cross-sectional view of a portable computer according to the present invention whose body is folded for conveyance;

FIG. 3 is a plane view showing the relation between a trackball and a main body of a portable computer according to the present invention;

FIG. 6 is a perspective view of another preferred embodiment of the present invention showing that a position of a receiving window is modified from the portable computer depicted in FIG. 4;

FIG. 7A is a block diagram of an interface system of a portable computer according to the present invention;

FIG. 7B is a block diagram of a trackball system of a portable computer according to the present invention;

DETAILED DESCRIPTION OF THE PREFERRED EMBODIMENTS

Figure 1:
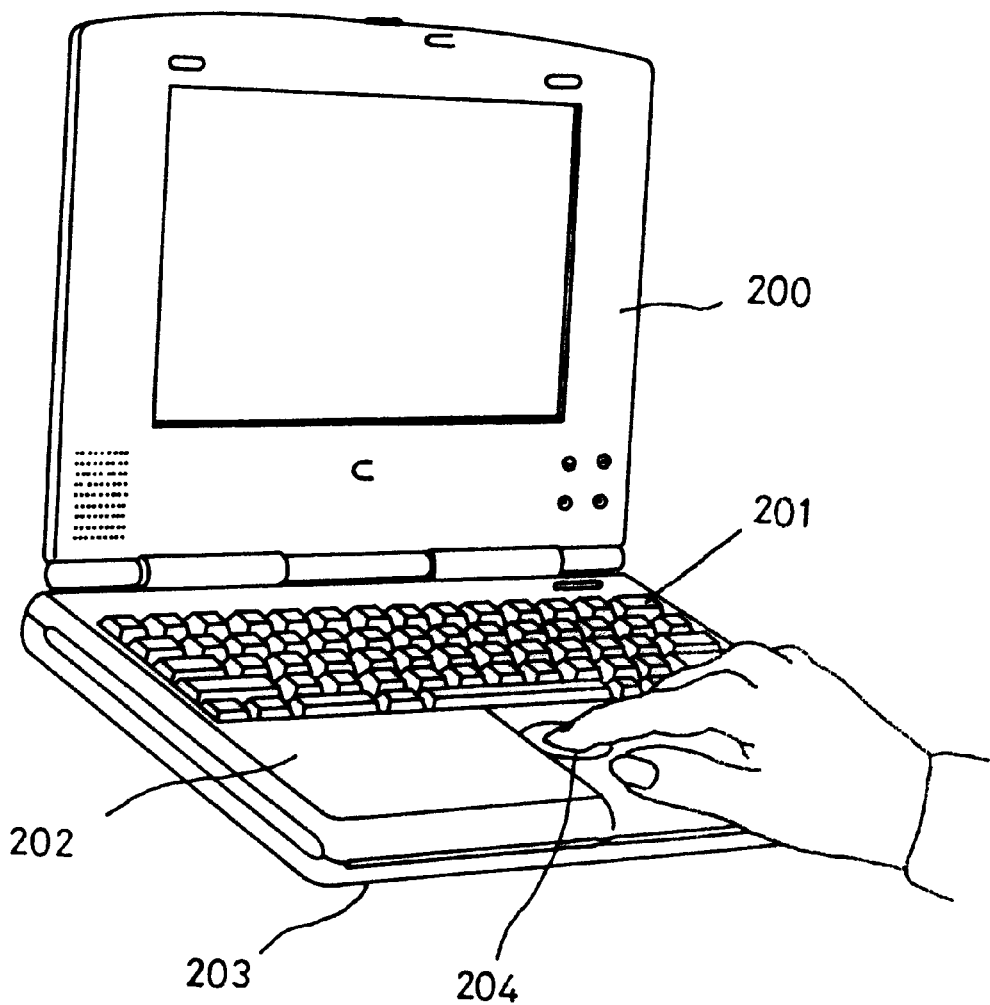
FIG. 1 is a perspective view of a conventional trackball-mounted portable computer.

FIGS. 2 through 6 are prepared for explanation of the operation of the preferred embodiments of the present invention. As shown, the construction of the present invention, a trackball for a portable computer (hereinafter referred to as simply "computer") is similar to the conventional trackball-mounted to a portable computer described before in that the present invention employs systematically a display assembly 100 for displaying alphanumeric information and data as an output device of a computer, a keyboard assembly 101 for entering data as an input device of a computer, and a top cover 105 and bottom cover 104 as enclosures of a computer. Different elements in construction therebetween are a trackball 102 and an interface. The interface is one portion of the circuitries in the main circuit board of the computer, and not depicted in drawings.

The trackball 102 transmits a cursor movement signal moving along an x and y-axis by a user's manipulation, through a wire while the trackball is mounted on the computer, or into the air with an optical signal while the trackball is detached from the computer.

The interface receives the cursor movement signal transmitted from the trackball 102 through a wire or through the air for processing said signal. The trackball and the interface themselves detect whether the trackball is mounted on or detached from the computer.

Figure 8:
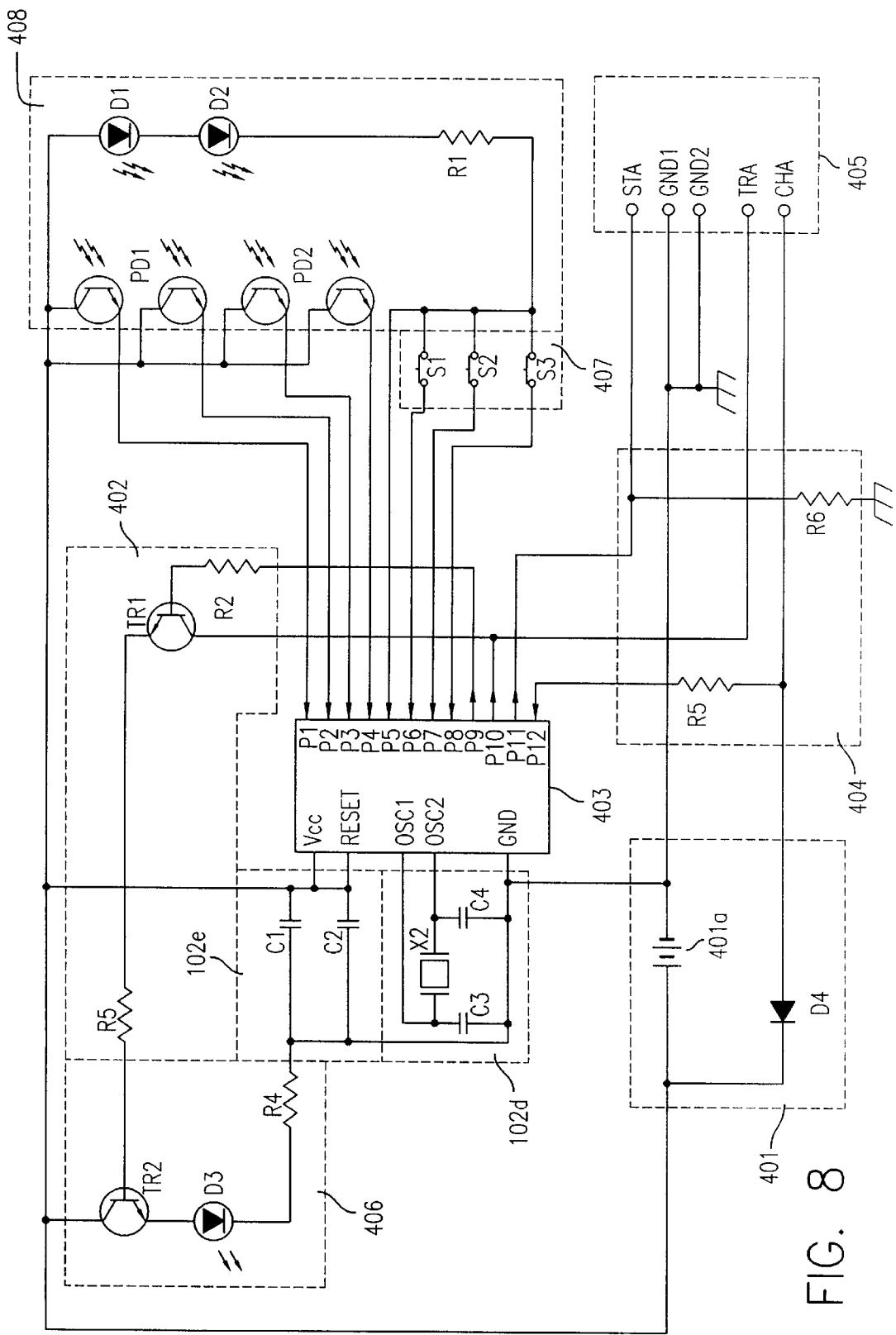
FIG. 8 is a circuit diagram of the trackball system depicted in FIG. 7B.

In electrical construction, the trackball 102 comprises, with regard to FIGS. 7B and 8, a position determiner 408 employing light-emitting devices D1, D2, a resistor R1, and photodetectors PD1, PD2 for converting the ball's movement into an electrical cursor movement signal; a trackball connector 405 positioned at the rear side of the trackball for delivering the cursor movement signal, or the like, to the interface while the trackball 102 is mounted on the computer; a trackball detector 404 for providing a detection signal in response to whether the trackball 102 is mounted on the computer or not; a trackball controller 403 for controlling the whole system of the trackball 102 by using the detection signal and the cursor movement signal from the trackball detector 404 and the position determiner 408; a transmitter 406 employing a transistor TR2 and a resistor R4 and a light-emitting device D3 for transmitting the cursor movement signal into the air with an optical signal; a transmitter switch 402 employing resistors R2, R3 and a transistor TR1 for switching on or off the supply power towards the transmitter 406 under the control of the trackball controller 403; a charger 401 employing a battery 401a and a diode D4 for being charged with the supply power Vcc from the interface while the trackball 102 is mounted on the computer, and for providing the charged power for the whole system of the trackball 102 while the trackball 102 is detached from the computer; and a key selector 407 employing switches S1–S3 for electing or aborting a menu on the display assembly 100.

Figure 9:
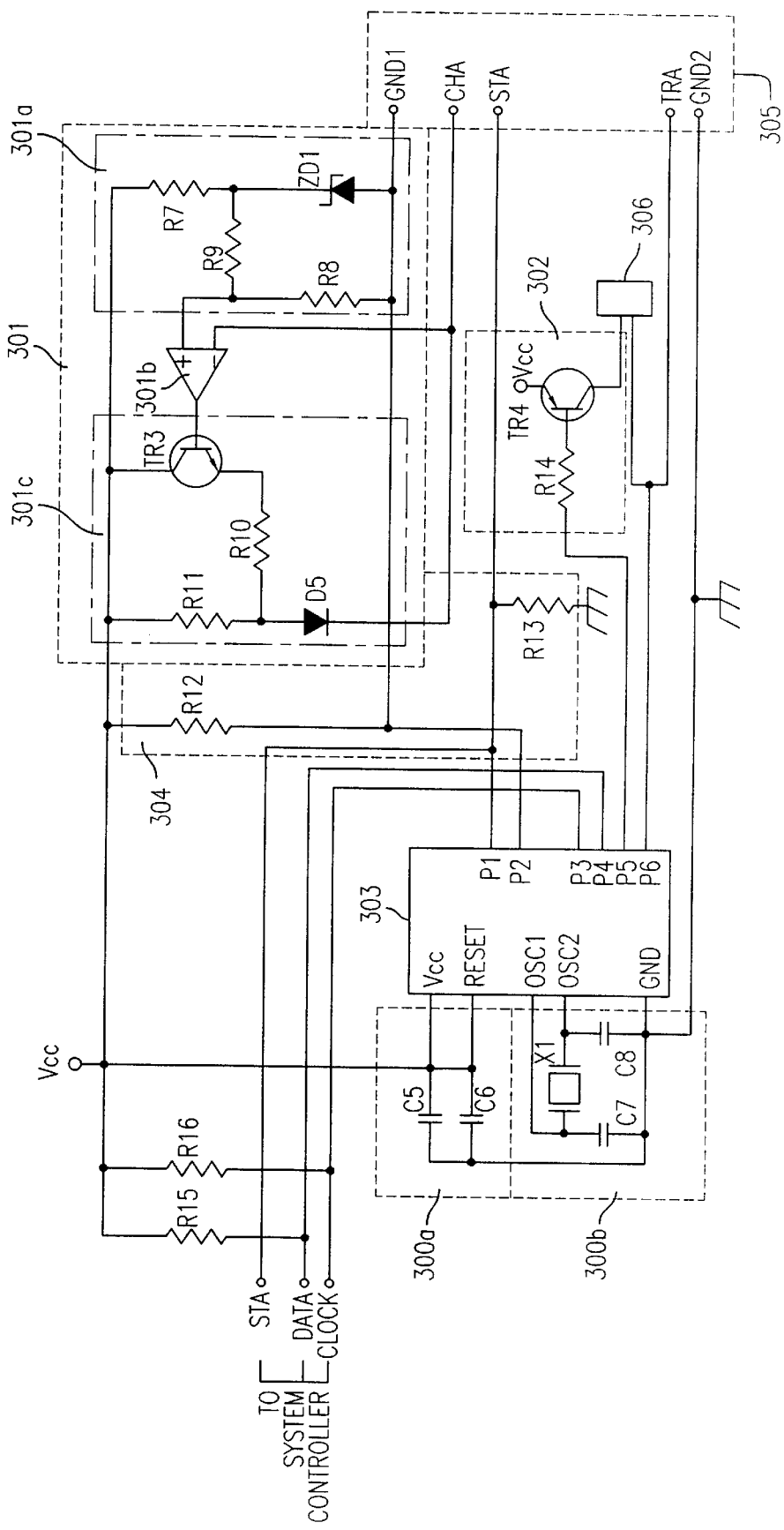
FIG. 9 is a circuit diagram of the interface system depicted in FIG. 7A.

The interface installed in a main body of the computer comprises, with reference to FIGS. 7A and 9, a main connector 305 positioned at the main circuit board of the computer for receiving the signals from the trackball 102; a main trackball detector 304 employing resistors R12, R13 for providing a detection signal in response to whether the trackball 102 is mounted on the computer or not; a receiver 306 for receiving signals transmitted from the transmitter 406 through a receiving window 110 to convert the optical signal into an electrical signal; a main controller 303 for controlling the whole operation of the interface by using the detection signal from the main trackball detector 304, and for separating a clock signal and a cursor movement data from the cursor movement signal; a receiver switch 302 employing a resistor R14 and a transistor TR4 for switching on or off the supply power towards the receiver 306 under the control of the main controller 303; and a charge voltage supply 301 for supplying the charger 401 with a regulated voltage through the main and trackball connector 305 and 405.

A remaining block, as marked 307 in FIG. 7A, is a system controller (this is not the construction of the present invention, but merely one portion of the main circuit board of the computer) which computes the cursor movement data with synchronization to the clock signal, and moves a cursor on the display assembly 100 along an x and y-axis.

The main connector 305 and the trackball connector 405, are both a pair of pin-to-pin type, include two ground terminals GND1, GND2, a charge terminal CHA, a track terminal TRA, and a state terminal STA. The track terminal TRA delivers the cursor movement data from the trackball controller 403 to the main controller 303, and vice versa. The state terminal STA delivers a state signal indicating the current state of the trackball controller 403 to the system controller 307 (a state signal indicating the current state of the main controller 303 is directly delivered to the system controller 307) for allowing the system controller 307 to check the main controller 303 and the trackball controller 403.

The charge voltage supply 301 of the trackball interface includes a voltage regulator 301a employing resistors R7, R8, R9 and a zener diode ZD1 for regulating the supply power Vcc, which the ground path, or GND1 of the voltage regulator 301a is an independent ground, while a ground GND2 is a system ground; a comparator 301b for comparing the charge votage being supplied to the charger 401 through the charge terminal CHA with the regulated voltage from the voltage regulator 301a; and a voltage controller 301c employing a transistor TR3 and resistors R10, R11 and a diode D5 for controlling the level of the charge voltage being supplied to the charger 401 through the charge terminal CHA, by being switched according to the output of the comparator 301b.

The reference numerals 102c and 300a in FIGS. 8 and 9 respectively show reset circuits for resetting the trackball controller 403 and the trackball controller 303, and 102d and 300b respectively show clock generators for generating system clocks for the above two controllers 303 and 403.

In mechanical construction, the trackball 102 contains therein a drawer handle 102a which can be drawn from inside to outside of the trackball 102 for a user's easy grasp. The drawer handle 102a slides within a case 102b of the trackball 102. The body of the computer has thereon a mounting holder 102c for holding the trackball 102.

The operation of the present invention will be described with regard to FIGS. 2 through 9 in detail. The operation when the trackball is mounted on the computer will be discussed first.

In operation relating to charging a supply power, when the trackball 102 is mounted on the body of the computer, both the trackball conector 405 and the main connector 305 are joined together so that such signals as the state signal STA, the charge signal CHA, and the track signal TRA are reciprocated between the trackball and the interface.

The independent ground GND1 of the main connector 305 is not contected with the system ground GND2 until two connectors 305 and 405 join together. Once two connectors 305 and 405 join together, the ground GND1 is not an independent ground any more. It has become a portion of the system ground GND2. Therefore, the charge voltage supply 301 can now provide an output voltage for the battery 401a in the charger 401.

The supply power Vcc is regulated to the even level at the voltage regulator 301a, and the regulated voltage is provided for the positive terminal(+) of the comparator 301b. Simultaneously, the supply power Vcc, through the resistor R11 and the diode D5 in the voltage controller 301c, is provided to the battery 401a through the diode D4 in the trackball 102 by the medium of the charge terminal CHA of both connectors 305 and 405. Therefore, the battery 401a will be charged with the supply power from the above voltage controller 301c. The amount of the voltage measured at the charge terminal CHA of the main connector 305 increases in proportion to the increment of the amount of charge of the battery 401a, and the voltage on the charge terminal CHA appears on the negative terminal(−) of the comparator 301b in the charge voltage supply 301.

While the battery 401a is being charged, since the voltage on the negative terminal of the comparator 301b is smaller than that on the positive terminal of the comparator 301b is smaller than that on the positive terminal (the voltage on the positive terminal of the comparator 301b, i.e., the regulated voltage provided from the voltage regulator 301a, is the very target charge voltage for the battery 401a), the comparator 301b outputs a high level signal so as to turn on the transistor TR3 in the voltage controller 301c.

At this time, because it is adjusted that the resistance of the resistor R10 is smaller than that of the resistor R11, the charge current flows into the battery 401a through the transistor TR3 and resistor R10 instead of the resistor R11. The reason why the charge current through the diode D4 goes to the plus terminal of the battery 401a, not anywhere else, is that the impedance of the battery 401a, because it is not yet charged completely, is smaller than that of other circuitries.

When the battery 401a completes charge, since the voltage on the negative terminal of the comparator 301b becomes equivalent to or higher than that on the positive terminal, the comparator 301b outputs a low level signal so as to turn off the transistor TR3.

At this time, the charge current, in this case the supply current, is supplied to the trackball 102 through the resistor R11 instead of through the resistor R10 and the transistor TR3. The resistance of the resistor R11 is set to the extent that the supply current may flow only enough to drive the small signal circuits of the trackball 102, because there is no necessity to charge the battery 401a longer. Since the impedance of the battery 401a is higher than that of any other circuitries, no supply current flows into the battery 401a.

In operation relating to detection whether the trackball 102 is mounted on the computer or not, when the main connector 305 and the trackball connector 405 join together, the ground path connected with the ground terminal GND1 is grounded to the system ground GND2, and then there appears a low level logic on an input port P2 of the main controller 303.

Accordingly, the main controller 303 detects that the trackball 102 is mounted on the computer, and then outputs a high level signal from its output port P5 so as to turn off the transistor TR4 in the receiver switch 302. The main controller 303 waits for the input of the cursor movement signal coming through the track terminal TRA from the trackball 102.

When the transistor TR4 is turned off, the supply power Vcc for driving the receiver 306 is removed, and then unnecessary energy consumption can be avoided. The receiver 306 is unnecessary because the trackball is now mounted on the computer.

Meanwhile, in the trackball 102, the trackball controller 403 detects that the trackball 102 is now mounted on the computer by reading the voltage, in this case the charge power, coming through the resistor R5 from the voltage controller 301c in the interface. In other words, when there appears a high level logic on an input port P12 of the trackball controller 403, the trackball controller 403 judges that the trackball is now mounted on the computer. Accordingly, the trackball controller 403 outputs a low level signal from its output port P9 so as to turn off the transisotr TR1 in the transmitter switch 402.

When the transistor TR1 is turned off, the transistor TR2 in the transmitter 406 is also turned off so that the supply power Vcc for driving the light-emitting device D3 is removed, and then unnecessary energy consumption can be avoided. The transmitter 406 is unnecessary because the trackball is now mounted on the computer.

In general operation of the trackball 102, when a user manipulates a ball on the trackball 102 for moving a cursor on the display of the computer, an optical signal emanating from the light-emitting devices D1, D2 in the position determiner 408 is transformed into a pulsed cursor movement signal by provided mechanical devices revolving respectively along an x and y-axis in proportion to the movement of the ball. The cursor movement signal received by the photodetectors PD1, PD2 is then applied to input ports P1–P4 of the trackball controller 403. The selection of each key switches S1–S3, i.e., the state whether the key switches S1–S3 are open or closed, of the key selector 407 is, in addition, applied to input ports P6–P8 of the trackball controlle 403.

Accordingly, the trackball controller 403 carries out a data-processing by the cursor movement signal from the position determiner 408, and outputs the data-processed cursor movement signal from its output port P10. This data-processed cursor movement signal does not go to the transmitter 406, but to an input port P6, of the main controller 303 through the track terminal TRA both of the trackball connector 405 and of the main connector 305, because the transistor TR1 of the transmitter switch 402 keeps being turned off.

The main controller 303 separates a cursor movement data and a clock signal from the data-processed cursor movement signal, and applies them to the system controller 307. A state signal indicating the current state of the trackball controller 403 is applied to the system controller 307 through the state terminal STA. A state signal indicating the current state of the main controller 303 is directly applied to the system controller 307.

The system controller 307 operates the cursor movement data with synchronization to the clock signal in order that a cursor may move along an x and y-axis on the display of the computer.

Meanwhile, considering the operation when the trackball 102 is detached from the computer, the trackball 102 is so small that a user cannot easily grip it, so it is preferable to use the drawer handle 102a existing inside the trackball case 102b as shown in FIG. 3.

When the trackball 102 is detached from the computer, that is, the main connector 305 and the trackball connector 405 are disconnected from each other, the ground terminal GND1 is separated from the system ground GND2, and then the charge voltage supply 301 does not work any more.

According to the separation of the ground terminal GND1, the supply power Vcc is applied to an input port P2 of the main controller 303 as a high level logic, and thereby the main controller 303 judges that the trackball 102 is now detached from the computer. At this time, the main controller 303 outputs a low level signal from its output port P5 to the transistor TR4 in the receiver switch 302, and receives the data-processed cursor movement signal, which comes from the transmitter 406 in the trackball 102, by its input port P6. When the transistor TR4 is turned on by the low level signal from the output port P5 of the main controller 303, the supply power Vcc is now be supplied to the receiver 306.

In the trackball 102, as shown in FIG. 8, the input voltage to an input port P12 of the trackball controller 403 goes from high to low because the charge power having been supplied through the charge terminal CHA is removed by disconnecting two connectors 305 and 405.

The trackball controller 403 reads thereby that the trackball 102 is now detached from the body of the computer. Accordingly, the trackball controller 403 outputs a high level signal from its output port P9 so as to turn on the transistor TR1 in the transmitter switch 402. When the transistor TR1 is turned on, the data-processed cursor movement signal from an output port P10 of the trackball controller 403 can now be delivered, as a gate signal, to the base of the transistor TR2 in the transmitter 406 through the transistor TR1.

The transistor TR2 is switched on or off according to the data-processed cursor movement signal from the output port P10, and thereby the light-emitting device D3 emits intermittently a light corresponding to the period of the data-processed cursor movement signal.

The source power to the trackball 102 when used in wireless mode is supplied by the charger 401. A diode D4 in the charger 401 portects the trackball controller 403 from an inverse-flowing current from the battery 401a when the trackball connector 405 is disconnected from the main connector 305.

The general operation in this case is the same as the case when the trackball 102 is mounted on the computer, the difference lies, however, in that the cursor movement signal is delivered from the trackball 102 to the interface through the air with an optical signal.

That is to say, by the transmitter 406 in the trackball 102, the data-processed cursor movement signal from the output port P10 of the trackball controller 403 is transmitted into the air with an optical signal instead of through the track terminal TRA of the trackball connector 405. The interface receives the transmitted optical signal through the air by the receiver 306 instead of through the main connector 305.

Figure 4:
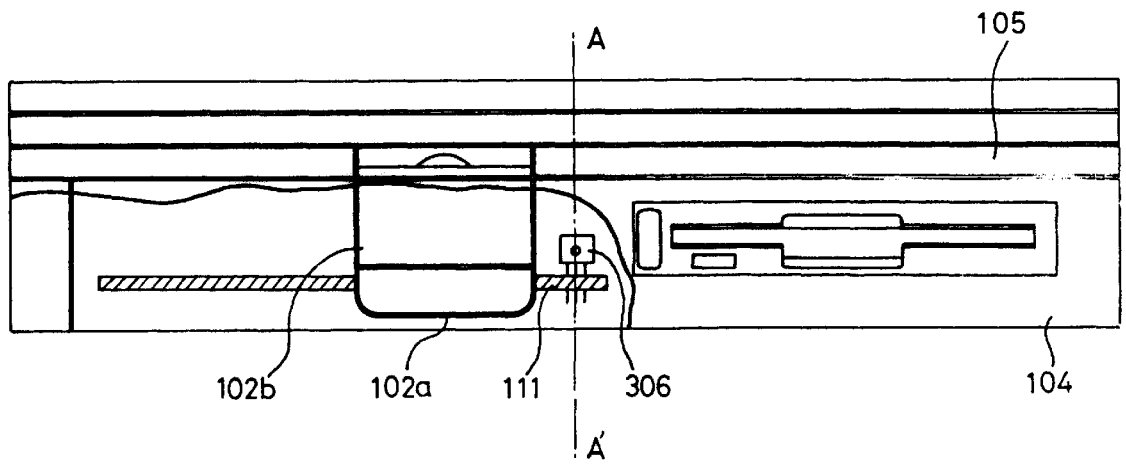
FIG. 4 is a front view, partly broken away, showing a protable computer according to the present invention on which a trackball is mounted.
Figure 5:
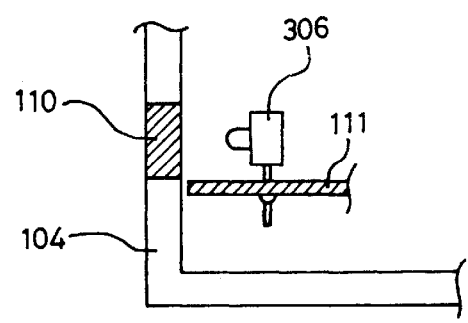
FIG. 5 is a detailed sectional view taken along the line A-A' of FIG. 4.

FIG. 6 shows another preferred embodiment of the present invention showing that a position of the receiving window 110 is modified in contrast with FIG. 4. The receiving window 110 may be placed anywhere.

As described hereinbefore, the present invention provides an efficacy in that the trackball may be used everywhere: in narrow space it is to be used with it mounted on the computer, while in free space it is to be used while detached.

What is claimed is:

1. A trackball set for a portable computer, the portable computer including a computer body, comprising:
   a wired/wireless trackball, which is capable of detecting whether it is mounted on or detached from the body of a portable computer, for transmitting an electrical signal through a wire when said trackball is mounted on the body, and a wireless signal into the air when said trackball is detached from the body, said wired/wireless trackball comprising:
   a ball;
   a case housing said ball;
   position determining means for determining the rotational position of said ball and outputting a cursor position signal in response thereto;
   a trackball wire interface including a wire for transmitting said cursor position signal when said trackball is mounted to the computer body;
   a wireless transmitter for transmitting said cursor position signal through the air when said trackball is detached from said computer body;
   a rechargeable battery for supplying power to said position determining means, to said wire interface, and to said wireless transmitter when said trackball is detached from said computer body; and
   a trackball controller for switching power to said wireless transmitter in response to a first electrical control signal being present at said trackball interface, wherein said first electrical control signal is a battery charge voltage from said computer interface; and a computer interface employed inside the portable computer, which is capable of detecting whether said trackball is mounted or detached from the computer body, for processing the wired cursor position signal through the wire when said trackball is mounted on the body, and for processing the wireless cursor position signal through the air when said trackball is detached from the computer body; said computer interface comprising:
   a computer wire interface for receiving said cursor position signal from said trackball wire interface when said trackball is mounted to said computer body;
   a wireless receiver for receiving said cursor position signal from said wireless transmitter when said trackball is detached from said computer body; and
   a computer interface controller for switching power to said wireless receiver in response to a second electrical control signal being present at said computer wire interface.

2. A trackball set according to claim 1 wherein said second electrical control signal is an input impedance to said rechargeable battery when said battery is fully charged.

3. A trackball set according to claim 2 wherein said computer interface controller includes a comparator for sensing when said battery is fully charged and turning off said battery charging voltage in response thereto.

4. A trackball set according to claim 1, wherein said trackball further comprises a drawer handle which can be drawn out of the case of said trackball.

5. A trackball according to claim 4, wherein said drawer handle slides within the case of said trackball.

* * * * *